US011899444B2

(12) United States Patent
Maurer et al.

(10) Patent No.: US 11,899,444 B2
(45) Date of Patent: Feb. 13, 2024

(54) REAL-TIME ALERTS AND TRANSMISSION OF SELECTED SIGNAL SAMPLES UNDER A DYNAMIC CAPACITY LIMITATION

(71) Applicant: Hewlett Packard Enterprise Development LP, Houston, TX (US)

(72) Inventors: Ron Maurer, Haifa (IL); Sagi Schein, Haifa (IL); Renato Keshet, Haifa (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/348,380

(22) Filed: Jun. 15, 2021

(65) Prior Publication Data

US 2021/0311468 A1    Oct. 7, 2021

Related U.S. Application Data

(63) Continuation of application No. 16/071,959, filed as application No. PCT/US2016/016511 on Feb. 4, 2016, now Pat. No. 11,061,395.

(51) Int. Cl.
*G05B 23/02*    (2006.01)
*G06N 3/044*    (2023.01)
*H04L 9/40*    (2022.01)

(52) U.S. Cl.
CPC ......... *G05B 23/0297* (2013.01); *G06N 3/044* (2023.01); *H04L 63/1425* (2013.01)

(58) Field of Classification Search
CPC . G05B 23/0297; G06N 3/044; H04L 63/1425
See application file for complete search history.

(56) References Cited

U.S. PATENT DOCUMENTS 8,594,866 B1    11/2013    Chen et al.
10,419,269 B2    9/2019    Danichev et al.
(Continued)

FOREIGN PATENT DOCUMENTS

CN    204147031 U    2/2015
KR    10-2009-0074317 A    7/2009
WO    2003/019377    3/2003

OTHER PUBLICATIONS

Allen et al., "Distribution Systems", American Water Works Association, 2011, 13 pages.
(Continued)

*Primary Examiner* — Roy Y Yi
*Assistant Examiner* — Geoffrey T Evans
(74) *Attorney, Agent, or Firm* — Hewlett Packard Enterprise Patent Department (57) ABSTRACT

Real-time alerts and transmission of selected signal samples is disclosed. One example is a system including a base facility linked to a production station with an alerting system to perform anomaly analysis utilizing an anomaly model. A receiver at the base facility receives, from the production station, a selection of signal samples based on the anomaly analysis, where the received selection is optimized at the production station to be substantially relevant to an update of a statistical model while adhering to a dynamic capacity limitation of the production station. The statistical model is maintained at the base facility and incorporates features related to the production station. A management system at the base facility updates the statistical model based on the received selection, optionally derives an updated anomaly model based on the statistical model, and optionally transmits the updated anomaly model to the production station.

20 Claims, 7 Drawing Sheets

(56) References Cited

U.S. PATENT DOCUMENTS

| | | |
|---|---|---|
| 2003/0204371 A1 | 10/2003 | Sciamanna |
| 2005/0196023 A1 | 9/2005 | Chen et al. |
| 2005/0216114 A1 | 9/2005 | Hsiung et al. |
| 2007/0219652 A1 | 9/2007 | McMillan |
| 2010/0100521 A1 | 4/2010 | Fujimaki et al. |
| 2012/0262303 A1 | 10/2012 | Fahey |
| 2015/0169393 A1 | 6/2015 | Shibuya |
| 2018/0023381 A1 | 1/2018 | Xue et al. |
| 2018/0219875 A1 | 8/2018 | Bania et al. |
| 2018/0248900 A1 | 8/2018 | Keshet et al. |

OTHER PUBLICATIONS

International Search Report and Written Opinion received for PCT Patent Application No. PCT/US16/16511, dated Dec. 1, 2016, 9 pages.

REAL-TIME ALERTS AND TRANSMISSION OF SELECTED SIGNAL SAMPLES UNDER A DYNAMIC CAPACITY LIMITATION

CROSS REFERENCE TO RELATED APPLICATIONS

This application is a continuation of, and claims the priority benefit of U.S. patent application Ser. No. 16/071,959, filed on Jul. 23, 2018, which is a 371 National Stage Entry of PCT/US2016/016511, filed on Feb. 4, 2016, the contents of which are incorporated herein by reference in their entirety.

BACKGROUND

Alert systems utilize analytics models to identify event patterns in a data stream. In some examples, some identified event patterns may be tagged as anomalies, and real-time alerts may be provided. In some examples, the analytics models may be maintained at a base station, while signals may be received at a plurality of remote stations that are linked to the base station.

DETAILED DESCRIPTION

Analytic models are utilized in a variety of applications, including for example, Internet of Things ("IoT"), and Interactive Analytics ("IA"). Generally, in IoT solutions, analytic models are created by a vendor and remain fixed throughout a system life. In some instances, the models are generated and/or maintained at a base facility that requires data to travel from a station where the data is collected, such as a remote station, and then alerts are transmitted back to the remote station. For example, in the Oil and Gas ("O&G") sector, hazard alerts are transmitted from a base facility to platforms at sea. Such a process imposes a delay on the alert time, and may be highly susceptible to network connection problems. Also some of the raw measurement data that is to be gathered in the base station for deep analysis may get lost when the network connection is interrupted for an extended period.

A typical scenario for IoT is such that one or more (usually remote) nodes have limited computing power and limited network bandwidth and availability. One example is that of O&G extraction companies, where remote nodes may be platforms and/or stations in the ocean. Multiple sensors on the O&G production equipment generate fast streams of measurement data. There is a need to process such data in real-time for immediate hazard alerts, as well as to collect all data in a data center away from the drilling site for safe keeping and further short term and long term analysis. Since the alerts can only be generated in the data center where the measurement data and additional data sources are available (seismic, weather, etc.), and where computing power is sufficient for advanced statistical analysis, alerts can generally not be provided in real-time. Hence, alerts to the offshore site are delayed, and susceptible to network interrupts. Also, inherently limited network bandwidth and availability in the offshore sites limits their ability to scale up the number, rate, and accuracy of the measurements since the required data transfer rate would surpass the limited network capacity.

The framework proposed herein provides analytic functionality to a variety of IoT, DMC, and IA use cases. More specifically, it provides a way to generate, maintain and apply analytics models, such as real-time alerts, in a three-tier system. The three-tier system distributed system framework enables remote locations with limited computation, storage, and networking resources to process high-rate measurement data streams in real-time. Accordingly, the remote locations may compute anomalies and other complex analytics for real-time and/or forward looking alerting, and select the right level of compressed data representation to cache and/or transmit from remote stations to the base facility, thereby mitigating the storage and/or bandwidth limitations of the remote stations.

For example, hazard alerts may be computed at a production station (or a remote/off station, or an oil rig at sea) in real-time, based on models maintained and/or generated at a base facility. In some examples, the models may be generated/updated at a global center based on data received from a plurality of base facilities and a plurality of production stations. This way, the anomaly computation may continue uninterrupted at the production station when the network (between the production station and the base facility) is interrupted, even for relatively extended periods of time. Additionally, smart data economization may be achieved based on the anomaly level. For example, redundant data may be discarded and/or compressed at the source in the remote station, thereby mitigating storage and/or network bandwidth limitations. Accordingly, the system may support a larger number of sensors and higher measurement rates without needing to invest in costly remote networking solutions.

As described in various examples herein, real-time alerts and transmission of selected signal samples is disclosed. One example is a system including a base facility linked to a production station with an alerting system to perform anomaly analysis utilizing an anomaly model. A receiver at the base facility receives, from the production station, a selection of signal samples based on the anomaly analysis, where the received selection is optimized at the production station to be substantially relevant to an update of a statistical model while adhering to a dynamic capacity limitation of the production station. The statistical model is maintained at the base facility and incorporates features related to the production station. A management system at the base facility updates the statistical model based on the received selection, optionally derives an updated anomaly model based on the statistical model, and optionally transmits the updated anomaly model to the production station.

The proposed distributed framework utilizes algorithms coupled with hardware at each one of a two-tier computational system (e.g., a remote node such as the production station, and an operations base such as the base facility), and their interconnections, in order to enable analytic model creation and consumption. In some examples, the distributed framework utilizes algorithms coupled with hardware at each one of a three-tier computational system (e.g., a remote node such as the production station, an operations base such as the base facility, and a high compute big data global center such as a global processing center), and their interconnections, in order to enable the analytic model creation and consumption. More specifically, several features described herein take the system described out of the realm of a general purpose computer that performs generic functions. For example, computer functionality is significantly enhanced via various described features, including at least features such as an algorithm to enable the cycle of economizing data to be transmitted from the remote node to the operations base using real-time data analysis at the remote node, utilization of the big data global center for model computation based on the transmitted data, utilization of the operations base for tracking results and maintaining appropriate models, and application of the anomaly model at the remote node. The proposed framework also provides an improvement to the technological field of real-time analytics by solving concrete problems that arise in the context of limited and/or dynamic capacity limitations of computer systems.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
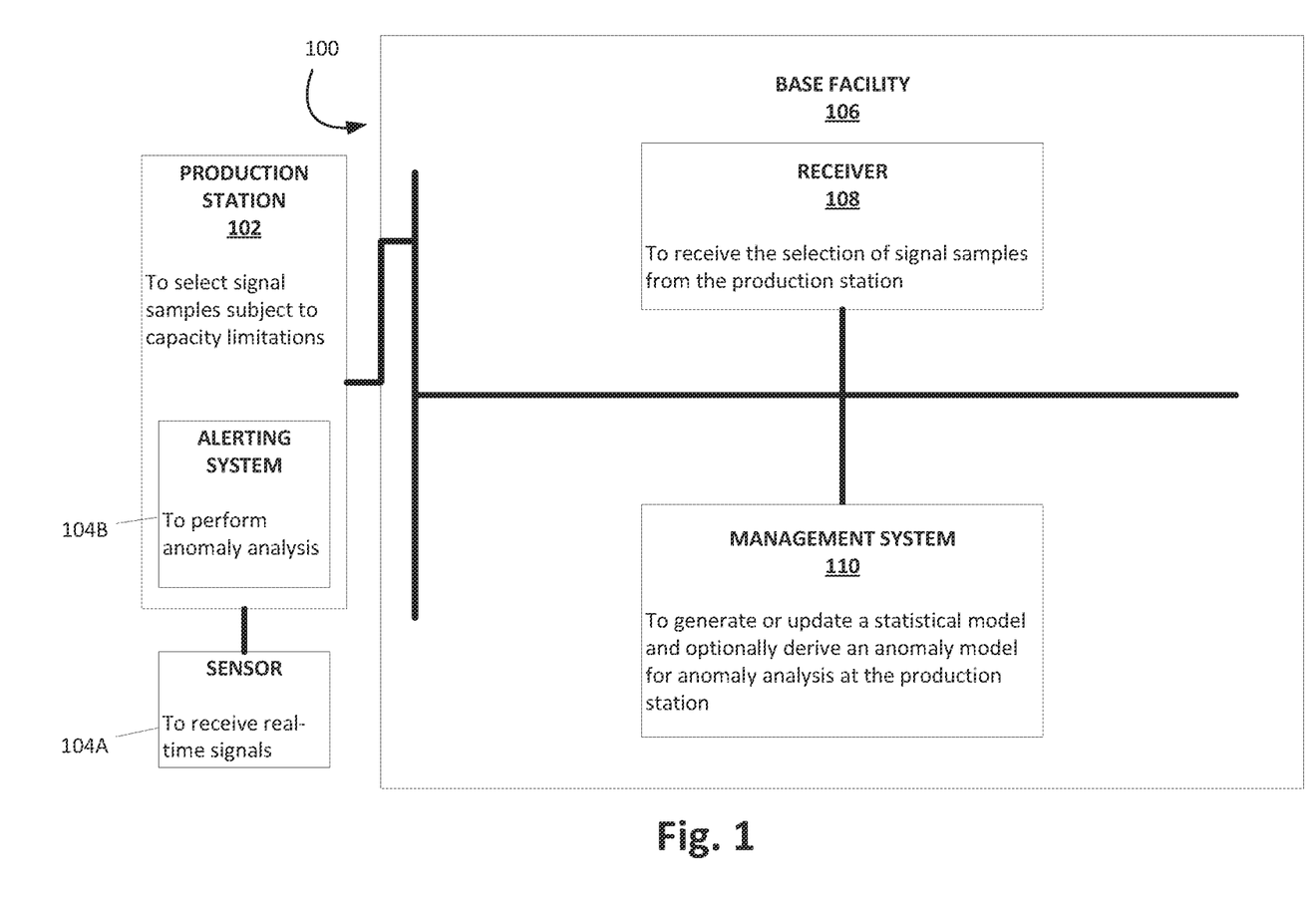
FIG. 1 is a functional block diagram illustrating one example of a system for real-time alerts and transmission of selected signal samples.

FIG. 1 is a functional block diagram illustrating one example of a system 100 for real-time alerts and transmission of selected signal samples. System 100 includes a base facility 106, comprising a receiver 108, and a management system 110. The base facility 106 is linked to a production station 102. Generally, the production station 102 is a local and/or remote station where real-time data is collected, processed, and real-time hazard alerts are provided. For example, the production station 102 may be a remote oil rig located in the ocean, a seismic device located at a location to detect seismic activity, or a satellite. The production station 102, as described herein, has a capability to intelligently select portions of real-time data that may need to be stored, processed, or sent over to a central command and control facility for deeper analysis. Generally, the production station 102 has limited computing and/or network resources. The base facility 106 is a command and control facility linked to the production station 102, and in some examples, to a plurality of production stations. The base facility 106 is equipped with comparatively greater computing resources than the production station 102, to receive the selected portions of the real-time data from the production system 102, analyze the received data, generate statistical and other anomaly and/or pattern detection models, incorporate data related to weather conditions, geographical conditions, resource allocations, equipment data, and so forth, to provide the production station 102 with a capability to maintain and run the real-time hazard alerting system, that may continue to analyze real-time data and provide relevant alerts even in an absence of a communication with the base facility 106. These and other features of system 100 are described herein.

Generally, remote production locations have limited computing power and working memory capacity, and hence are not equipped for the complex intensive data analysis needed to transform the sensor data streams into detailed statistical models that are needed for detecting or predicting anomalies indicative of potential hazards or production inefficiencies. In addition, due to limited long term storage and limited network bandwidth and availability, the remote production location may have very limited access to its own historical data, to historical data from other remote production locations, or to other data on environmental conditions which need to be factored into the statistical model (e.g. seismic, weather). Generally, in order to overcome these limitations, the remote production stations are equipped to receive alerts on potential hazards or production inefficiencies based on communication with a base station, such as the base facility 106, which does not have the capacity limitations of the production station 102. For example, the remote production station 102 receives the signals from the local sensors, transmits them to the base facility 106, where they are gathered and analyzed optionally in conjunction with historical data or environmental data. The base facility 106 detects anomalies based on the analysis alerts and transmits appropriate alerts back to the remote production station 102. This method of overcoming the capacity limitations of the remote production station 102, makes the alerting dependent on communication with the base facility 106.

However, in many situations, as a result of limited network availability, the remote production station 102 might lose communication with the base facility 106 for extended periods of time, effectively leaving the remote production station 102 without a capability to generate alerts. In addition, the remote production locations may receive multiple real-time sensor signals at a high rate, and their reduced data storage and signal transmission capacities may not be able to keep up with the high rate of incoming data. The data storage problem may be further aggravated at network down times. Accordingly, signal samples may be lost, and some signals may not be processed or analyzed. In particular, during critical times of safety events when there is an increased risk of communication loss, there may also be an increased risk of losing data that may be critical to infer a cause of a safety event in retrospect. In addition, data loss at the remote production station 102 may impact the quality of signal analysis and statistical modeling at the base facility 106, and reduce the quality of anomaly detection, so significant alerts may not be provided. Therefore, it is desirable to implement a system where the production station 102 may have the capacity to continuously analyze the incoming signals, and provide alerts, even with limited computing power, and optionally in an absence of a network connection for prolonged times, and/or low network bandwidth in a communication link with the base facility 106.

As described herein, the production station 102 includes a sensor 104A to receive real-time signals. The sensor 104A may be located at the production station 102, or in a proximity of the production station 102. As described herein, the production station 102 is equipped with an alerting system 104B to perform anomaly analysis on the real-time signals received by the sensor 104A, and where the anomaly analysis utilizes an anomaly model. In some examples, the production station 102 provides alerts based on the detected event patterns. The alerting system 104B has a capability to perform anomaly analysis on the real-time signals. Generally, the alerting system 104B may function under dynamic capacity limitations of the production station 102. For example, the alerting system 104B may function even when the link with the base facility 106 is not active. For example, a network that links the production station 102 and the base facility 106 may be interrupted, have low bandwidth, and/or there may be a network failure. However, the alerting system 104B may continue to perform anomaly analysis and provide alerts based on the existing anomaly model.

System 100 includes the receiver 108 at the base facility 106 to receive, from the production station 102, a selection of signal samples based on the anomaly analysis, where the received selection is optimized at the production station 102 to be substantially relevant to an update of a statistical model while adhering to a dynamic capacity limitation of the production station 102, and where the statistical model is maintained at the base facility 106 and incorporates features related to the production station 102. For example, the selection of signal samples may be optimized to adhere to a storage capacity limitation, so that signal samples that are substantially relevant to a model update may be stored. Also, for example, the selection of signal samples may be selected to adhere to a limited network capacity, so that signal samples that are substantially relevant to a model update may be selected for transmission to the base facility 106. As another example, the selection of signal samples may be selected to adhere to a dynamic network bandwidth, so that a smaller collection of signal samples are provided to the base facility 106 when the available network bandwidth is low, and the smaller sample is selected based on relevance to an update of the statistical model. Also, for example, the selection of signal samples may be selected to adhere to a dynamic incoming rate of real-time signals, so that signal samples that are substantially relevant to a model update may be selected at a rate that is consistent with the rate of incoming real-time signals.

Generally, the statistical model at the base facility 106 consists of a summarization of selected features of the signal samples, for example in the form of a data clustering model, and the production station 102 identifies the selection of signal samples based on the anomaly analysis. Signal samples measured at times where the overall anomaly scores are high bear the most significant information both for alerting and for updating the overall statistical model of the signal, since they correspond to a situation that is not common (by definition of "anomaly"), and hence not well represented in the statistical model (not substantially similar to any data cluster). In some examples, adhering to the dynamic capacity limitation of the production station 102 may generally mean that such high anomaly samples get preference for transmission to the base facility 106 and caching in the remote production station 102.

Signal samples measured at times where the overall anomaly score is low belong in fact to data-clusters already significantly represented in the statistical model. Hence, these samples may be subject to selective data reduction or data selection depending on which parts of the signal sample are determined by the anomaly model to be more common. In some examples, adhering to the dynamic capacity limitation of the production station 102 may generally mean such selective reduction or data selection. For example, if the anomaly analysis includes measuring the similarity of a signal sample to common data clusters, then the data reduction may consist of identifying the most similar cluster. If the anomaly analysis does not identify a similar cluster, the data reduction may include signal sub-sampling, signal quantization or feature summarization. Overall, the production station dynamically optimizes a trade-off between representation accuracy and size of the selected data so it adheres to the dynamic network capacity and data caching capacity in the production station 102, while remaining substantially relevant to the update of the statistical model to cover parts of the signal distribution that may not be represented well in the model yet.

The dynamic capacity limitation of the production station 102 may include limited computing power, working memory capacity, long term storage capacity, network bandwidth, network failure, network downtime, and/or other computing power, infrastructure, and/or network related measurements. The term dynamic generally refers to a potential change in computing and/or network resources. For example, a large number of signals may be analyzed during a first interval of time and may result in lower computing power, lower working memory capacity, and so forth. Also, for example, the network may be intermittent. As another example, the dynamic capacity limitation may be a fluctuating network bandwidth. As another example, a network failure may result in a large amount of data not being transferred from the production station 102 to the base facility 106, thereby leading to decreased storage capacity. A key aspect of system 100 is an ability to continue to perform an effective anomaly analysis under limited computing resources, while being able to send relevant data over to the base facility 106 for deeper analysis and potential updates.

For example, the capacity limitation may be a network failure causing a loss of the communication link between the production station 102 and the base facility 106. However, equipped with the alerting system 104B, the production station 102 may apply the anomaly model to detect anomalies in the real-time signals even in the absence of the communication link with the base facility 106. The production station 102 may identify the selection of signal samples, where the selection adheres to changes in data cache capacity caused by the network failure. Accordingly, the production station 102 may identify when the network is restored, and may provide the selection to the base facility 106 when the network is restored. Accordingly, a continuous and updated hazard alert system is deployed, and historical signal data that is identified as relevant is saved and transmitted to the base facility 106.

In some examples, due to the capacity limitation and a relatively high data rate, the temporal features extractors from the signals may be limited to low complexity short window or recursive operators. In some examples, detected event patterns may be cached and transmitted together with the raw signal samples to the base facility 106 for storage and statistical modeling.

Generally, raw measurements may be recorded at a higher rate than necessary at most times, in order to be able to respond to physical phenomena on the shortest time scale of interest, but these phenomena may occur in extraordinary conditions, i.e. when there are anomalies in some of the measurements. At these times, it is important to transmit to the base facility 106, the complete raw signal for subsequent analysis beyond just anomaly modeling. However, at many times when there are no significant anomalies, transmitting a full resolution signal may be unnecessary, as the relevant information is sufficiently contained in a sub-sampled version of the raw signal, and in the extracted signal features and/or event patterns, and generally with lower data rate than the raw signals in their entirety.

As described herein, the received selection may be optimized at the production station 102 to be substantially relevant to an update of the statistical model while adhering to the dynamic capacity limitation of the production station 102. In some examples, the production station 102 may include an anomaly handling block (not shown) that caches and analyzes a stream of anomaly scores for a plurality of detected anomaly-event patterns. Unlike a high data rate of the raw measurement streams, the extracted anomaly-score streams are sparse (e.g., zero most of the time), and hence highly compressible. In some examples, the extracted anomaly-score streams may be transformed into a stream of isolated anomaly events, each tagged by measurement type, event pattern type, and anomaly score and a timestamp. This anomaly-event stream may be selected to conform to a low data rate, thereby allowing local caching of extended history periods, even under significant storage limitations at production stations.

Also, for example, since the anomaly scoring on each individual event pattern occurs in real-time, it may be possible to dynamically combine the anomaly scores in a variety of ways to generate specific anomaly detectors for system-wide hazards or sub-system related hazards. Participating event patterns in each anomaly, their combination weights, and the alert threshold, may be controlled dynamically either from the base facility 106, or locally at the production station 102. This may reduce potential volatility of the hazard alert system to network intermissions.

Also, for example, a significant benefit of the fact that the anomaly scores may be computed at the production station 102 in real-time is that they may be utilized to select the times at which raw measurement samples are important to cache and transmit in full detail, and determine the times at which a low detail summary is sufficient. Accordingly, the selection may be optimized to be substantially relevant while adhering to the dynamic capacity limitation. For example, a real-time selectivity mechanism may significantly reduce, on average, a rate of raw signal data to be cached at the production station 102, and transmitted to the base facility 106, thus mitigating both the storage and network limitations of the production station 102.

In some examples, the practical benefits of the data selection scheme described herein may be that more signal streams may send the relevant data over the same limited network bandwidth. Also, significantly longer history of relevant data may be cached at the production station 102 under the same capacity limitations (e.g., storage limitations), which may increase resiliency against long network intermissions, where data in a cache at the production station 102 may be overwritten if not already transmitted to the base facility 106.

The statistical model, as described herein, may be generally maintained at the base facility 106 and may measure signals, and/or properties of signals received from the production station 102. The term "maintain" as used herein may generally refer to a variety of computing functions including generating, and/or updating the statistical model, incorporating conditions data, storing and/or updating a database to store aspects of the model, retrieving data from the database, maintaining communication links and/or network protocols with computing devices in a distributed framework so as to provide models derived from the statistical model, and so forth. Maintaining the statistical model may generally require larger computing resources than what may be available at the production center 102. Also, for example, the base facility 106 may be linked to a plurality of production stations and received signals from the plurality of production stations. In such examples, the statistical model may incorporate signals and/or properties of signals received from all these production stations. Generally, the statistical model receives the selection from the production station 102 via the receiver 108, and analyzes the received selection. Also, for example, the statistical model may not be capable of performing the anomaly analysis. However, the anomaly model performs the anomaly analysis, and may be derived from the statistical model.

The base facility 106 is generally a regional station that communicates with a plurality of production stations. Data is gathered from remote stations, and statistical models are computed for tactical purposes such as hazard alerts and production monitoring. The base facility 106 generally has fewer limitations of compute power, storage, or network, and is equipped to perform significantly extensive data analytics. Generally, it has the ability to gather data, analyze it, detect patterns, and design appropriate models that may be suitable to be operable at the different production stations, based on their respective capacity limitations. The framework of the base facility 106 is targeted towards optimized signal representations and data size economizations to make system 100 more scalable.

System 100 includes a management system 110 at the base facility 106 to update the statistical model based on the received selection. In some examples, the management system 110 may configure the alerting system 104B to detect anomaly events in the real-time signals, and where the received selection includes a selection of the detected anomaly events. In some examples, the statistical model may include an anomaly event patterns model, and the management system 110 may update the anomaly event patterns model based on the received selection. In some examples, the anomaly events may also be computed separately at the production station 102 and cached there as well.

In some examples, the management system 110 may configure the alerting system 104B to determine anomaly scores for detected event patterns, and update the anomaly scoring models based on statistical analysis of the history of the observed data. In some examples, the management system 110 may configure the alerting system 104B to apply anomaly pattern alerting rules to provide alerts at the production station, and where the management system 110 may update the alerting rules based on the updated anomaly event patterns model. In some examples, the determination of the anomaly scores may be performed in real-time. The anomaly scoring models may be updated when enough additional data has been gathered, or when external conditions that influence the anomaly score determination change sufficiently. Once sufficient statistics have been gathered at the base facility 106 for a variety of external conditions (e.g., weather, humidity, seismic), the anomaly scores change slowly in time. Accordingly, the real-time anomaly score determination is sufficiently accurate even if the anomaly scoring models included in the existing anomaly model at the production station 102 are somewhat outdated.

The management system 110 generates or updates the statistical model based on the anomaly detection rules, where the statistical model incorporates features related to the production station 102. As described herein, the statistical model is generally a model based on history of data collected over time from a particular production station 102. Features related to the production station 102 may generally refer to any data that may be relevant to the operation or functioning of a facility at the production station 102. For example, operation of an oil rig at the sea may be influenced by local features such as temperature and humidity conditions, seismic conditions, tidal patterns, wind conditions, and so forth. Also, for example, the features may include any relevant data related to machinery, computer systems, and so forth that are pertinent to the production station 102. In some examples, the features may include parameters of the capacity limitation of the production station 102.

The anomaly events may be analyzed at the base facility 106 by standard data mining techniques to find recurring event patterns (basket analysis for simultaneous anomalies, and sequence analysis for temporal anomaly patterns). Subject matter experts (SMEs) at the base facility 106 may tag event patterns indicative of known problem types and create anomaly detection rules for higher level event pattern detection. These anomaly detection rules may be transmitted to the production station 102 over the network, stored and updated at the production station 102 for real-time application to the anomaly event stream incoming from the anomaly scoring system. Again, these anomaly detection rules may be applied at the production station 102 without interruption, even if their updates lag due to network intermissions.

Generally, the anomaly detection algorithms may need to consider a time relevance of the models sent from the base facility 106, in case communications are down for a while. Nevertheless, in many examples, a model that was generated several hours ago may be almost as relevant as a recently updated model, and may be more relevant than a model that does not account for historical signal data at all.

In some examples, system 100 includes a graphical user interface (not shown in the figures) to provide, via a computing device at the base facility 106, an incrementally updated computer generated visual rendition of the selection of received selection. For example, a real-time signal series may be provided, with signal samples, event patterns, anomalies, anomaly scores, etc. displayed along with the signal series. In some examples, the graphical user interface may receive, via the computing device, an indication to tag a signal sample or event pattern as relevant. For example, the SME may provide an indication to tag certain event patters as relevant. Also, for example, a machine learning system may automatically provide an indication to tag certain event patters as relevant based on labeled training data. In some examples, the management system 110 may create the anomaly pattern alerting rules based on the indication.

In some examples, the base facility 106 may be linked to more than one production station 102, such as a second production station (not shown in the figures), and the management system 110 may update a second statistical model that incorporates features related to the second production station. The update of the second statistical model may be based on a second received selection from the second production station, and the second received selection may be optimized at the second production station to be substantially relevant to an update of the second statistical model, while adhering to a second dynamic capacity limitation of the second production station.

For example, the receiver 108 may receive a second selection of signal samples from the second production station, where the second selection is based on additional real-time signals received by a second sensor at the second production station, and where the second selection adheres to an additional capacity limitation at the second production station. For example, the second production station may be a remote oil rig subject to different features (equipment, weather conditions, etc.) and may be subject to a separate set of limitations with respect to data storage capacity, rate at which incoming signal data is received, processing speeds, computing power, network bandwidth, and so forth. Accordingly, the second selection may be tailored to adhere to such an additional capacity limitation of the second production station.

In some examples, the management system 110 creates additional anomaly detection rules based on the second selection, and generates or updates a second statistical model based on the additional anomaly detection rules, where the second statistical model incorporates features related to the second production station and global features related to the production station 102 and the second production station. For example, the management system 110 may incorporate features that are specific to each production station, and also identify and incorporate global features that may be relevant to more than one production station. For example, a first collection of production stations may be seismic counters located near regions with potential volcanic activity, whereas a second collection of production stations may be seismic counters located near oceanic regions with potential tsunami activity. Accordingly, although the local feature may be conditions relevant to the individual seismic counters, a first set of global features may be identified for the first collection of production stations based at least in part on their proximity to regions with potential volcanic activity. Likewise, a second set of global features may be identified for the second collection of production stations based at least in part on their proximity to regions with potential tsunami activity.

Accordingly, different statistical models may be configured and/or updated for each of the production stations. In some examples, the statistical model may incorporate only local features, or only global features, or a combination of both. The management system 110 generates and/or updates small statistical models (e.g. PDFs or short time predictors conditional on operating conditions at a local production station), and transmit them once every period of time. Such models form a baseline for anomaly detection and/or detection of event patterns and real-time analysis of the streaming data at the production station 102. Although the anomaly models may be generated, and/or derived at the production station 102, such models may be inadequate for a lack of historical signal data (based on limited data storage capacities).

In some examples, the base facility 106 receives conditions data including weather data from an online provider, and the management system 110 incorporates the conditions data into the statistical model. For example, operation of an oil rig at the sea may be influenced by features such as temperature and humidity conditions at the oil rig, seismic conditions, tidal patterns, wind conditions, and so forth. The management system 110 incorporates such conditions data into the statistical model.

In some examples, the management system 110 derives an updated anomaly model based on the statistical model when it is determined that the anomaly model is to be updated. As described herein, the management system 110 generates or updates small statistical models and/or small size anomaly maps, that may be derived from the statistical model, for the signal features and/or event patterns, and transmits these anomaly maps over the network back to the production station 102.

In some examples, the management system 110 may determine if the anomaly model is to be updated based on the updated statistical model, where the determination is based on changes in the statistical model. For example, the received selection may be indicative of new signal samples, and the statistical model may be updated based on the new signal samples. The management system 110 may determine if the existing anomaly model in the alerting system 104B at the production station 102 is equipped to detect the new signal patterns. In some examples, the management system 110 may determine that the existing anomaly model at the production station 102 is equipped to detect the new signal patterns. Accordingly, it may not derive an updated anomaly model. In some examples, the management system 110 may determine that the existing anomaly model at the production station 102 is not equipped to detect the new signal patterns. Accordingly, it may derive an updated anomaly model.

In some examples, the management system 110 transmits the updated anomaly model to the production station when it is determined that the capacity limitation allows the transmit. For example, based on the capacity limitations and differences between the existing anomaly model at the production station 102, and the updated anomaly model derived at the base facility 106, the management system 110 may determine if the updated anomaly model is to be provided to the production station 102. In some examples, such a determination may be based on a number of factors. For example, availability of a higher network bandwidth may prompt the management system 110 to derive an updated anomaly model. Also, for example, the management system 110 may determine that the computing resources available at the production station 102 have increased, and may determine that an updated anomaly model may be transmitted. As another example, conditions data may be indicative of an impending severe weather condition, and the management system 110 may determine that an updated anomaly model may need to be transmitted to the production station 102 that is likely to be potentially impacted by the severe weather condition. In some examples, the management system 110 may automatically update the statistical model periodically, derive an updated anomaly model, and transmit it to the production station 102.

In some examples, similar production stations may be grouped together in a cluster based on a similarity metric, and statistical models may be aggregated from similar production stations. Generally, defining such similarity may require domain knowledge. In some examples, system 100 may receive, via a computing device at the base facility 106, input from SME to determine the similarity, and/or identify the clusters of production stations. Accordingly, system 100 may provide real-time hazard estimation while still accounting for historical data from a plurality of production stations.

In some examples, the base facility 106 may be linked to a global processing center (not shown in the figures). Generally, the global processing and/or analytics center is where all data from a plurality of base facilities and a plurality of production centers may be gathered, and global statistical models may be computed for strategic proposes (e.g., global modeling for optimized alert accuracy and data compression, global production monitoring and optimization, etc.).

For example, the global processing center may collect raw data samples from the production stations via intermediary regional base facilities. The global center is generally equipped with high performance computing capabilities and can run for example, deep learning algorithms on signal samples gathered from a plurality of production stations. An over complete dictionary of basic signal elements may be learnt from the gathered data, either by auto encoder layers of deep networks, or by another high end dictionary learning method. In some examples, similar production stations may be grouped together in a cluster based on a similarity metric, and the dictionary may be generated for the cluster based on the plurality of event patterns and signal samples received from the production stations in the cluster.

In some examples, the receiver 108 in the base facility 106 may receive a dictionary of signal elements from the global processing center, where the dictionary is generated by the global processing center based on deep learning algorithms performed on a plurality of event patterns and signal samples received from a plurality of production stations via a plurality of base facilities. In some examples, the management system 110 may utilize the dictionary to create and/or update the anomaly detection rules, and utilize the dictionary to generate and/or update the statistical model. In some examples, the management system 110 provides the dictionary to the production station 102, and the production station 102 optimizes the received selection based on a representation of the signal samples by the signal elements, where an error in the representation of the signal sample is small if the signal sample is substantially represented as a combination of a small number of the signal elements.

For example, a signal snippet may be identified in the real-time signals at the production station 102, and the signal snippet may be represented as a combination of few signal elements from the dictionary. Generally, a majority of raw signal snippets may have accurate sparse representations as combinations of few dictionary elements, and a very small residual that is not represented well by any other dictionary element. Accordingly, a signal novelty scoring system (not shown in the figure) may determine a signal novelty score for the signal snippet based on an error in the approximating. In some examples, each signal snippet may be represented with a small number of signal elements from the dictionary such that remaining residual is below a threshold. If the signal snippet is novel, i.e. not well represented by existing signal elements from the dictionary, leaving a large residual, then the novelty score is determined to be high. In some examples, a signal snippet is included in the selection of signal samples if the signal novelty score is determined to exceed a threshold. Such signal snippets with high novelty scores may be transmitted in their entirety to the base facility 106 and from there to the global processing center, to be learnt by the signal dictionary deep learner.

As described herein, system 100 may be implemented by a computing device. As used herein, a computing device may be a desktop computer, laptop (or notebook) computer, workstation, tablet computer, mobile phone, smart device, switch, router, server, blade enclosure, or any other processing device or equipment including a processing resource. In examples described herein, a processing resource may include, for example, one processor or multiple processors included in a single computing device or distributed across multiple computing devices. The components of system 100 (e.g., 106, 108, and 110) may be any combination of hardware and programming to implement the functionalities described herein. In examples described herein, such combinations of hardware and programming may be implemented in a number of different ways. For example, the programming for the components may be processor executable instructions stored on at least one non-transitory machine-readable storage medium and the hardware for the components may include at least one processing resource to execute those instructions. In some examples, the hardware may also include other electronic circuitry to at least partially implement at least one component of system 100. In some examples, the at least one machine-readable storage medium may store instructions that, when executed by the at least one processing resource, at least partially implement some or all of components 106, 108, and 110 of system 100. In such examples, system 100 may include the at least one machine-readable storage medium storing the instructions and the at least one processing resource to execute the instructions. In other examples, the functionalities of any components of system 100 may be at least partially implemented in the form of electronic circuitry.

For example, the receiver 108 may be a combination of hardware and programming (e.g., processor executable instructions) to receive, at the base facility 106, a selection of signal samples from the production station 102. For example, the programming of receiver 108 may include instructions executable to automatically receive the selection of signal samples. Also, for example, receiver 108 may include hardware to physically store, for example, the selection of signal samples. Also, for example, receiver 108 may include a combination of hardware and software programming to dynamically interact with the other components of system 100.

Likewise, the management system 110 may be a combination of hardware and programming (e.g., processor executable instructions) to update the statistical model based on the received selection. Also, for example, the programming of management system 110 may include instructions executable to automatically generate or update a statistical model based on the anomaly detection rules, where the statistical model incorporates features related to the production station 102. As another example, the programming of management system 110 may include hardware to physically store, for example, the statistical models. The management system 110 may include a combination of hardware and software programming to dynamically interact with the other components of system 100.

Likewise, the production station 102 may be a combination of hardware and programming (e.g., processor executable instructions) to automatically receive real-time signals via a sensor at the production station 102, where the production station 102 is associated with a dynamic capacity limitation. As another example, the programming of production station 102 may include instructions to automatically perform, via an alerting system, anomaly analysis on real-time signals received by a sensor, where the anomaly analysis utilizes an anomaly model. Also, for example, the programming of production station 102 may include instructions to automatically identify, at the production station 102, a selection of signal samples and detected event patterns, where the selection adheres to a dynamic capacity limitation of the production station 102. The production station 102 may include a combination of hardware and software programming to dynamically interact with the other components of system 100.

Generally, as described herein, the components of system 100 may include software programming and physical networks to be linked to other components of system 100. In some instances, the components of system 100 may include a processor and a memory, while programming code is stored on that memory and executable by a processor to perform designated functions.

A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
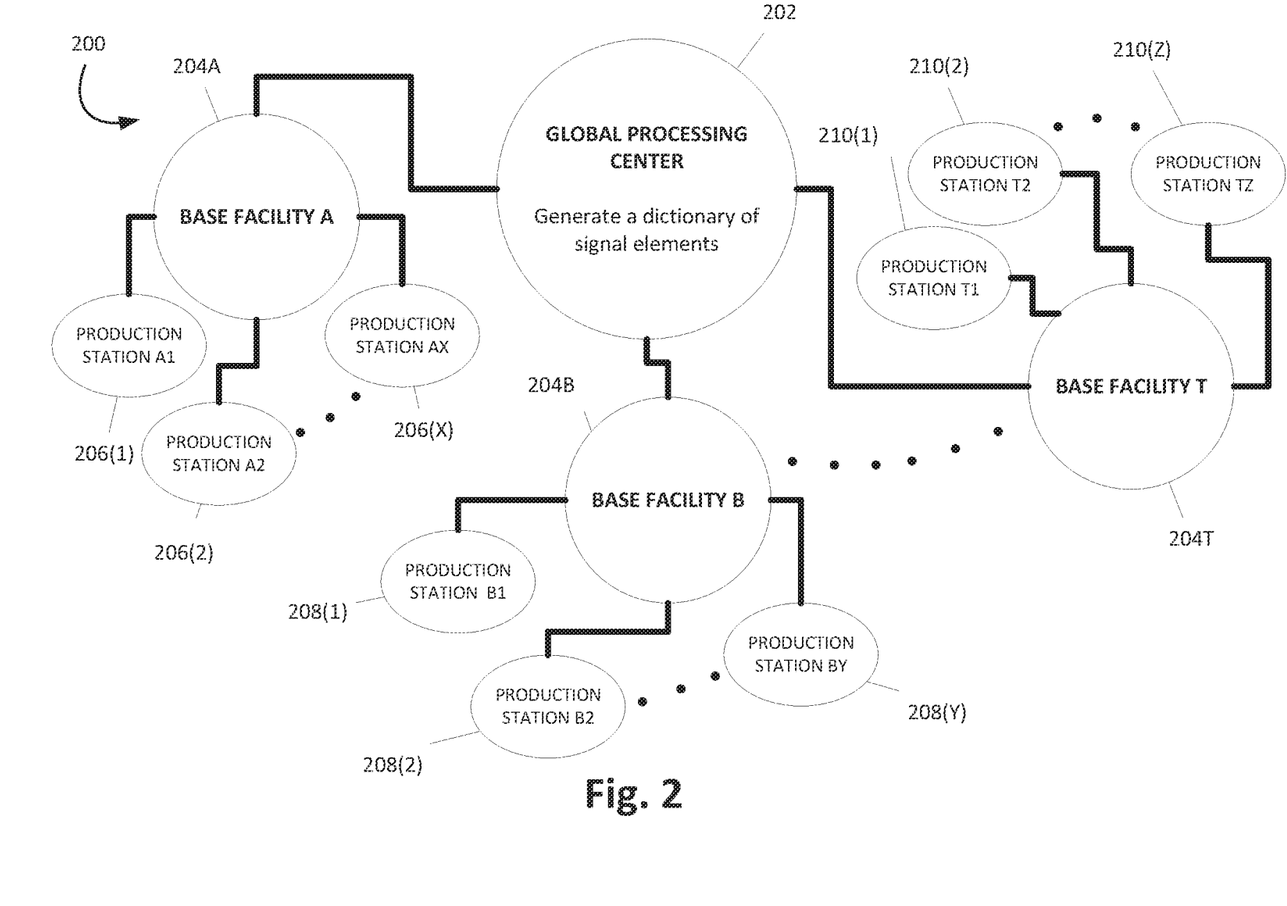
FIG. 2 is another example graphical illustration of a distributed system for real-time alerts and transmission of selected signal samples.

FIG. 2 is another example graphical illustration of a distributed system 200 for real-time alerts and transmission of selected signal samples. Distributed system 200 comprises a global processing center 202 linked to a plurality of base facilities, such as base facility A 204A, base facility B 204B, . . . , base facility T 204T. Each base facility is linked to a plurality of production stations. For example, base facility A 204A is linked to a plurality of production stations such as production station A1 206(1), production station A2 206(2), . . . , production station AX 206(X). As another example, base facility B 204B is linked to a plurality of production stations such as production station B1 208(1), production station B2 208(2), . . . , production station BY 206(Y). Also, for example, base facility T 204T is linked to a plurality of production stations such as production station T1 210(1), production station T2 210(2), . . . , production station TZ 210(Z).

As described herein, base facility A 204A may generate and update a first statistical model based on a first set of features that are relevant to production station A1 206(1); a second statistical model based on a second set of features that are relevant to production station A2 206(2), and so forth. Also, for example, base facility A 204A may generate and update some of the statistical models based on global features relevant to more than one production station. In some examples, the global processing center 202 may generate a dictionary of signal elements based on data received from production station A1 206(1), production station A2 206(2), . . . , production station AX 206(X), production station B1 208(1), production station B2 208(2), . . . , production station BY 206(Y), and production station T1 210(1), production station T2 210(2), . . . , production station TZ 210(Z). Each of these production stations may receive the dictionary of signal elements, identify and score signal snippets in real-time signals, and determine if a signal snippet is to be discarded, or saved and/or provided to a respective base facility for further analysis. Once new signal snippets arrive at the base facilities, these may be forwarded to the global processing center 202 so that the dictionary of signal elements may be updated. Although not illustrated in FIG. 2, a production station may be linked to more than one base facility.

Figure 3:
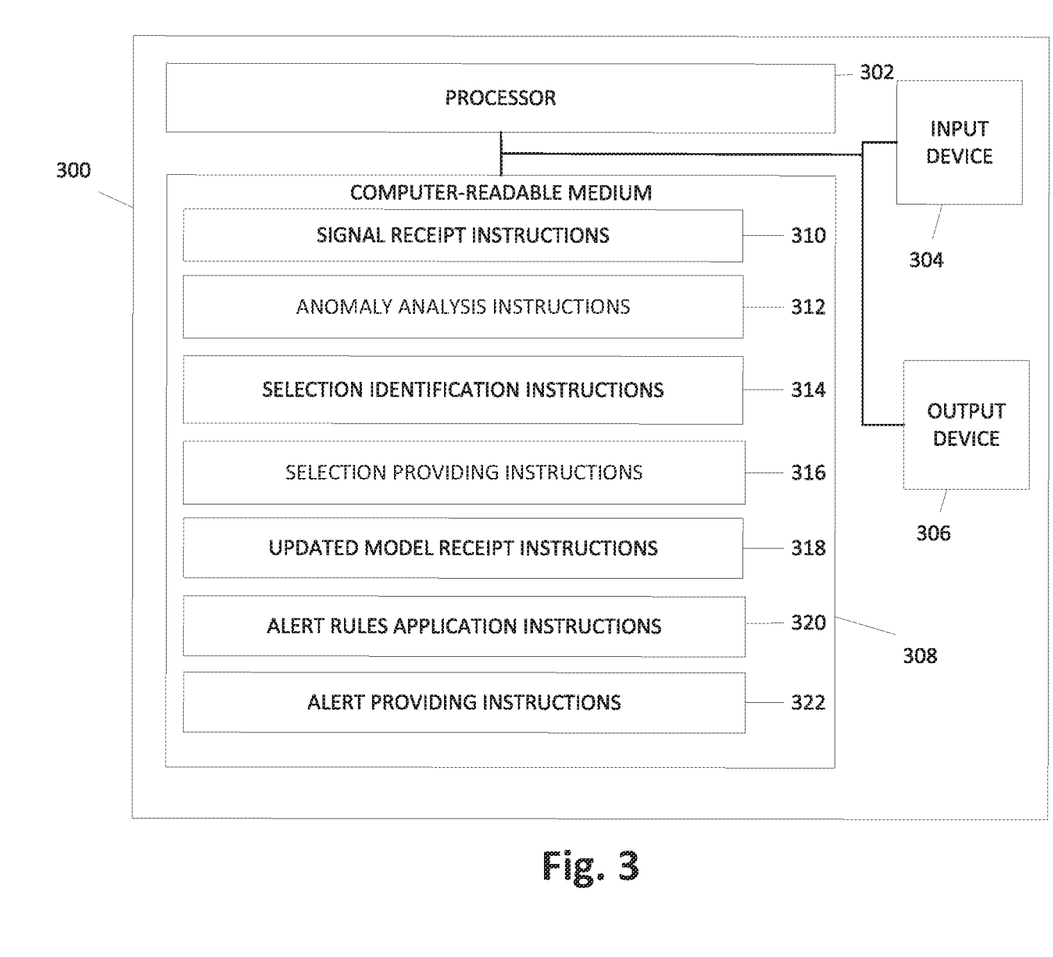
FIG. 3 is a block diagram illustrating one example of a computer readable medium for real-time alerts and transmission of selected signal samples.

FIG. 3 is a block diagram illustrating one example of a computer readable medium for real-time alerts and transmission of selected signal samples. Processing system 300 includes a processor 302, a computer readable medium 308, input device 304, and output device 306. Processor 302, computer readable medium 308, input device 304, and output device 306 are coupled to each other through a communication link (e.g., a bus).

Processor 302 executes instructions included in the computer readable medium 308. Computer readable medium 308 includes signal receipt instructions 310 to receive real-time signals via a sensor at a production station, wherein the production station is associated with a dynamic capacity limitation.

Computer readable medium 308 includes anomaly analysis instructions 312 to perform, via an alerting system, anomaly analysis on real-time signals received by a sensor, wherein the anomaly analysis utilizes an anomaly model.

Computer readable medium 308 includes selection identification instructions 314 to identify, at the production station, a selection of signal samples based on the signal analysis, wherein the selection is optimized at the production station to be substantially relevant to an update of a statistical model while adhering to the dynamic capacity limitation of the production station, and wherein the statistical model is maintained at a base facility linked to the production station, and wherein the statistical model incorporates features related to the production station.

Computer readable medium 308 includes selection providing instructions 316 to provide the selection to the base facility, wherein the base facility updates the statistical model based on the received selection, and derives an updated anomaly model based on the statistical model when it is determined that the anomaly model is to be updated.

Computer readable medium 308 includes updated model receipt instructions 318 to receive the updated anomaly model from the base facility to perform anomaly analysis, when it is determined that the capacity limitation allows the production station to receive the updated anomaly model.

Computer readable medium 308 includes alert rules application instructions 320 to utilize the anomaly alerting rules to apply anomaly pattern alerting rules.

Computer readable medium 308 includes alert providing instructions 322 to provide alerts at the production station, wherein the alerts are generated based on the anomaly pattern alerting rules.

In some examples, computer readable medium 308 includes instructions to receive a dictionary of signal elements from a global processing center linked to the base facility, instructions to identify a signal snippet of the received real-time signals, instructions to approximate the signal snippet as a combination of the signal elements, instructions to determine a signal novelty score for the signal snippet based on an error in the approximating, and instructions to include the signal snippet in the selection of signal samples if the signal novelty score exceeds a threshold.

Input device 304 may include a sensor, keyboard, mouse, data ports, and/or other suitable devices for inputting information into processing system 300. In some examples, input device 304, such as a sensor, may be utilized to receive the real-time signals via the sensor. In some examples, input device 304, such as a computing device, may be utilized to receive an indication to tag a signal sample or event pattern as relevant. Output device 306 may include a monitor, speakers, data ports, and/or other suitable devices for outputting information from processing system 300. In some examples, output device 306 may be utilized to provide, via a computing device at the base facility, an incrementally updated computer generated visual rendition of the selection of signal samples. In some examples, output device 306 may be utilized to provide, in real-time via a computing device at the production station, an incrementally updated computer generated visual rendition of the detected event patterns.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 308 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 300 are identified and refer to a combination of hardware and programming configured to perform a designated visualization function. As illustrated in FIG. 3, the programming may be processor executable instructions stored on tangible computer readable medium 308, and the hardware may include processor 302 for executing those instructions. Thus, computer readable medium 308 may store program instructions that, when executed by processor 302, implement the various components of the processing system 300.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 308 may be any of a number of memory components capable of storing instructions that can be executed by Processor 302. Computer readable medium 308 may be non-transitory in the sense that it does not encompass a transitory signal but instead is made up of one or more memory components configured to store the relevant instructions. Computer readable medium 308 may be implemented in a single device or distributed across devices. Likewise, processor 302 represents any number of processors capable of executing instructions stored by computer readable medium 308. Processor 302 may be integrated in a single device or distributed across devices. Further, computer readable medium 308 may be fully or partially integrated in the same device as processor 302 (as illustrated), or it may be separate but accessible to that device and processor 302. In some examples, computer readable medium 308 may be a machine-readable storage medium.

Figure 4:
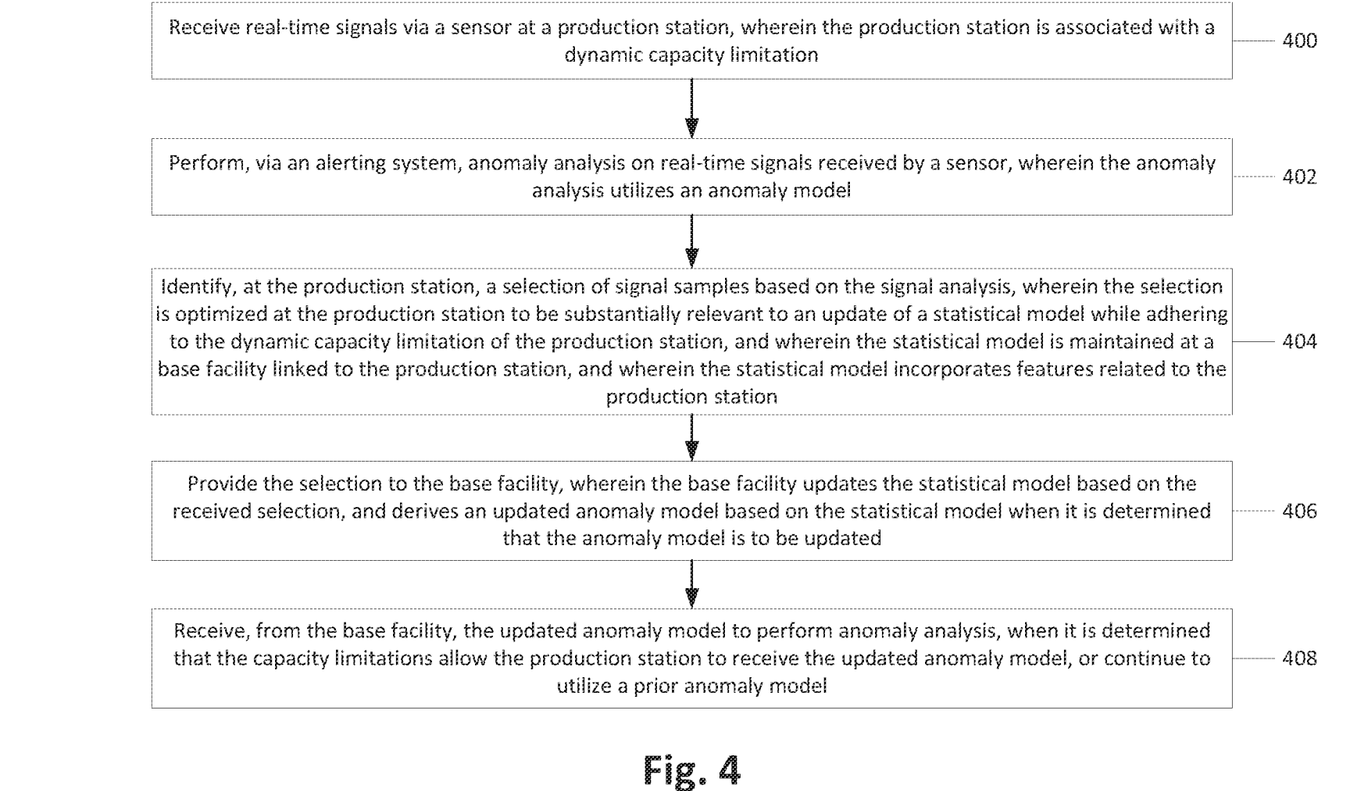
FIG. 4 is a flow diagram illustrating one example of a method for real-time alerts and transmission of selected signal samples.

FIG. 4 is a flow diagram illustrating one example of a method for real-time alerts and transmission of selected signal samples. In some examples, such an example method may be implemented by a system such as, for example, system 100 of FIG. 1.

At 400, real-time signals are received via a sensor at a production station, where the production station is associated with a dynamic capacity limitation.

At 402, anomaly analysis is performed on real-time signals received by a sensor, where the anomaly analysis utilizes an anomaly model and is performed via an alerting system.

At 404, a selection of signal samples is identified based on the signal analysis, where the selection is optimized at the production station to be substantially relevant to an update of a statistical model while adhering to the dynamic capacity limitation of the production station, and where the statistical model is maintained at a base facility linked to the production station, and where the statistical model incorporates features related to the production station.

At 406, the selection is provided to the base facility, where the base facility updates the statistical model based on the received selection, and derives an updated anomaly model based on the statistical model when it is determined that the anomaly model is to be updated.

At 408, the updated anomaly model to perform anomaly analysis is received from the base facility, when it is determined that the capacity limitation allows the production station to receive the updated anomaly model, or the prior anomaly model is continued to be utilized.

Figure 5:
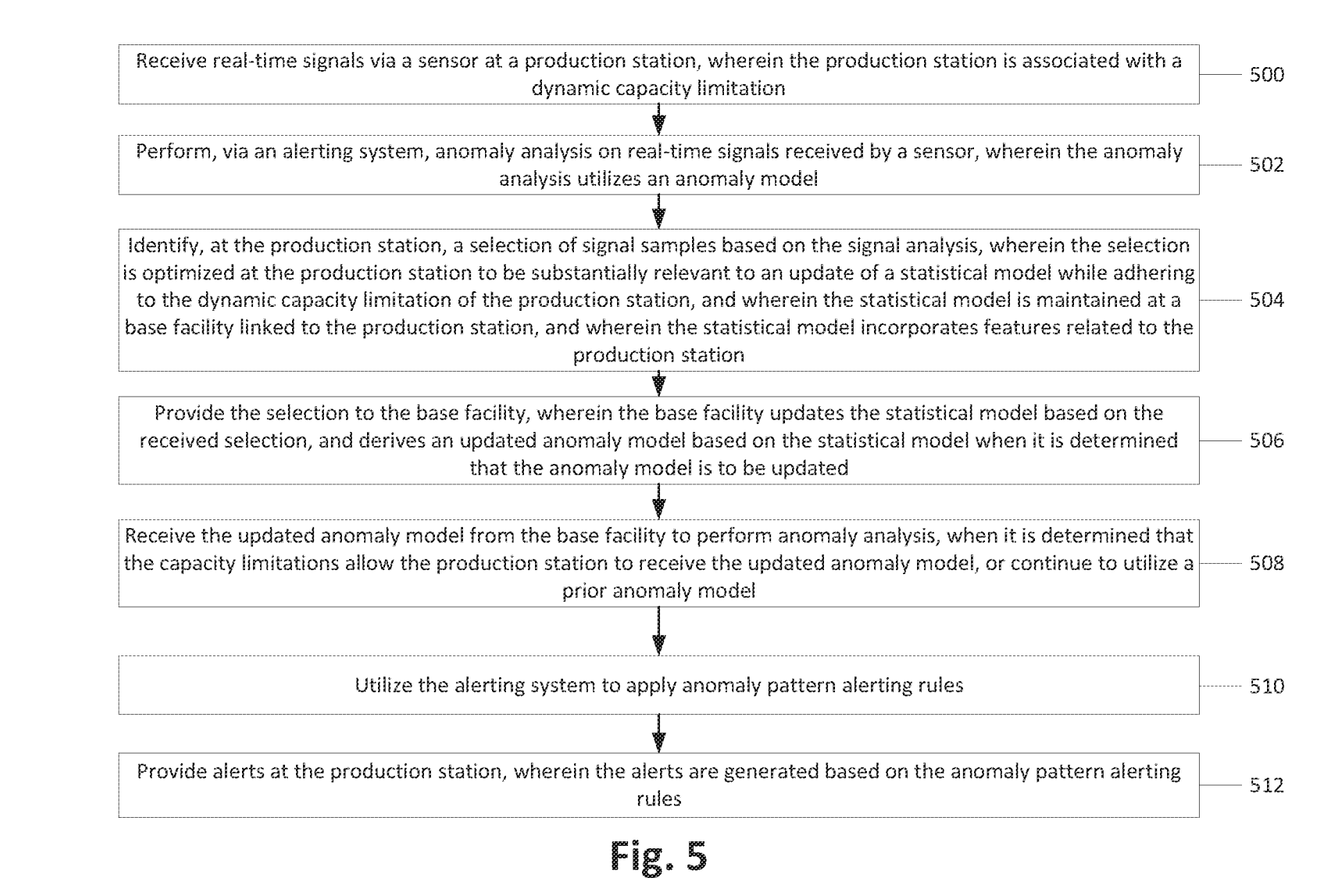
FIG. 5 is a flow diagram illustrating one example of a method for providing alerts at a production station.

FIG. 5 is a flow diagram illustrating one example of a method for providing alerts at a production station. In some examples, such an example method may be implemented by a system such as, for example, system 100 of FIG. 1.

At 500, real-time signals are received via a sensor at a production station, where the production station is associated with a dynamic capacity limitation.

At 502, anomaly analysis is performed on real-time signals received by a sensor, where the anomaly analysis utilizes an anomaly model and is performed via an alerting system.

At 504, a selection of signal samples is identified based on the signal analysis, where the selection is optimized at the production station to be substantially relevant to an update of a statistical model while adhering to the dynamic capacity limitation of the production station, and where the statistical model is maintained at a base facility linked to the production station, and where the statistical model incorporates features related to the production station.

At 506, the selection is provided to the base facility, where the base facility updates the statistical model based on the received selection, and derives an updated anomaly model based on the statistical model when it is determined that the anomaly model is to be updated.

At 508, the updated anomaly model to perform anomaly analysis is received from the base facility, when it is determined that the capacity limitation allows the production station to receive the updated anomaly model, or the prior anomaly model is continued to be utilized.

At 510, the alerting system is utilized to apply anomaly pattern alerting rules.

At 512, alerts are provided at the production station, where the alerts are generated based on the anomaly pattern alerting rules.

Figure 6:
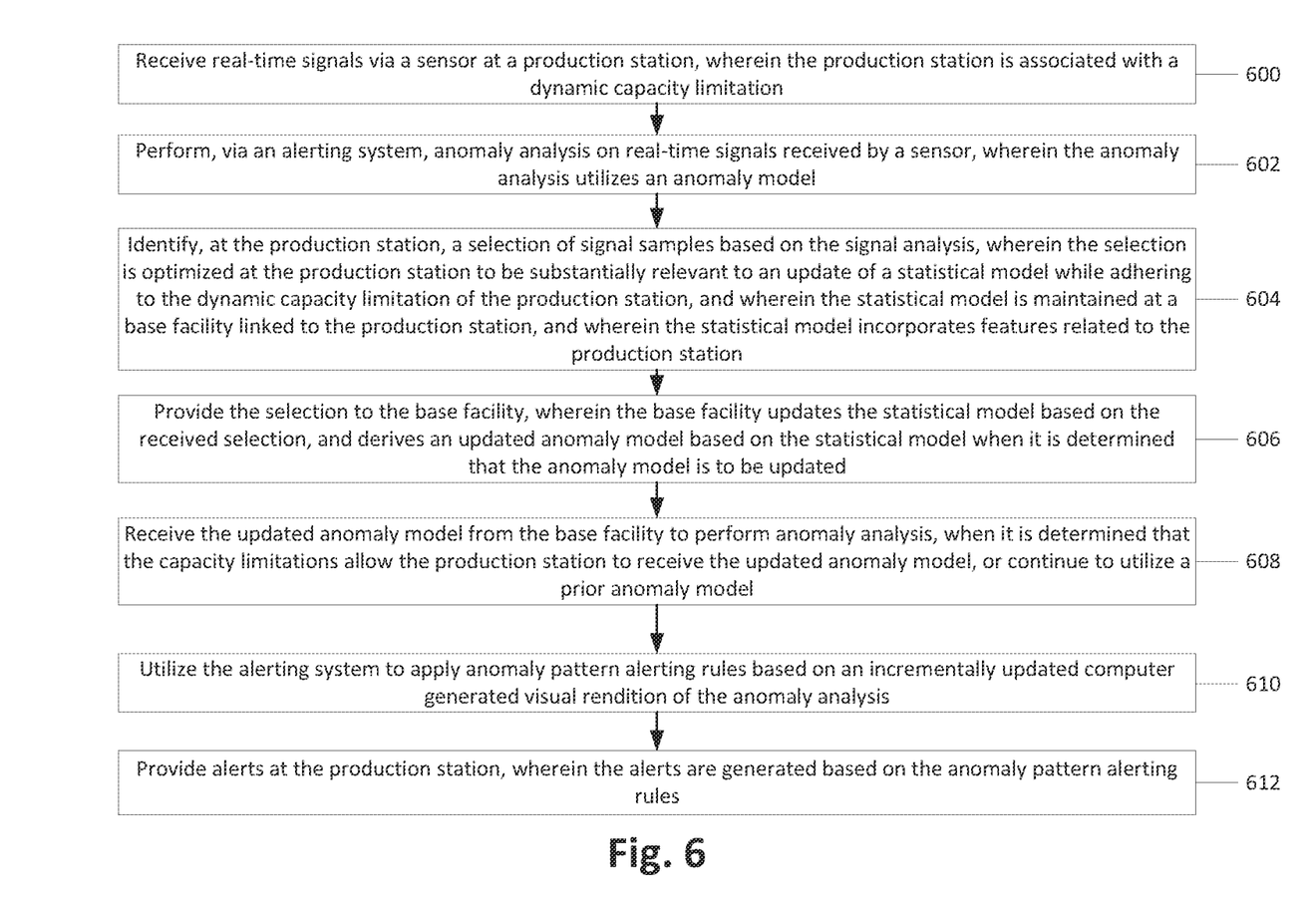
FIG. 6 is a flow diagram illustrating one example of a method for providing an incrementally updated computer generated visual rendition of an anomaly analysis at a production station.

FIG. 6 is a flow diagram illustrating one example of a method for providing an incrementally updated computer generated visual rendition of an anomaly analysis at a production station. In some examples, such an example method may be implemented by a system such as, for example, system 100 of FIG. 1.

At 600, real-time signals are received via a sensor at a production station, where the production station is associated with a dynamic capacity limitation.

At 602, anomaly analysis is performed on real-time signals received by a sensor, where the anomaly analysis utilizes an anomaly model and is performed via an alerting system.

At 604, a selection of signal samples is identified based on the signal analysis, where the selection is optimized at the production station to be substantially relevant to an update of a statistical model while adhering to the dynamic capacity limitation of the production station, and where the statistical model is maintained at a base facility linked to the production station, and where the statistical model incorporates features related to the production station.

At 606, the selection is provided to the base facility, where the base facility updates the statistical model based on the received selection, and derives an updated anomaly model based on the statistical model when it is determined that the anomaly model is to be updated.

At 608, the updated anomaly model to perform anomaly analysis is received from the base facility, when it is determined that the capacity limitation allows the production station to receive the updated anomaly model, or the prior anomaly model is continued to be utilized.

At 610, the alerting system is utilized to apply anomaly pattern alerting rules based on an incrementally updated computer generated visual rendition of the anomaly analysis. For example, the incrementally updated computer generated visual rendition of the anomaly analysis may be provided via a computing device at the production station. An indication to tag a signal sample or anomaly event pattern as relevant may be received via the computing device, and anomaly pattern alerting rules based on the indication may be generated.

At 612, alerts are provided at the production station, where the alerts are generated based on the anomaly pattern alerting rules.

Figure 7:
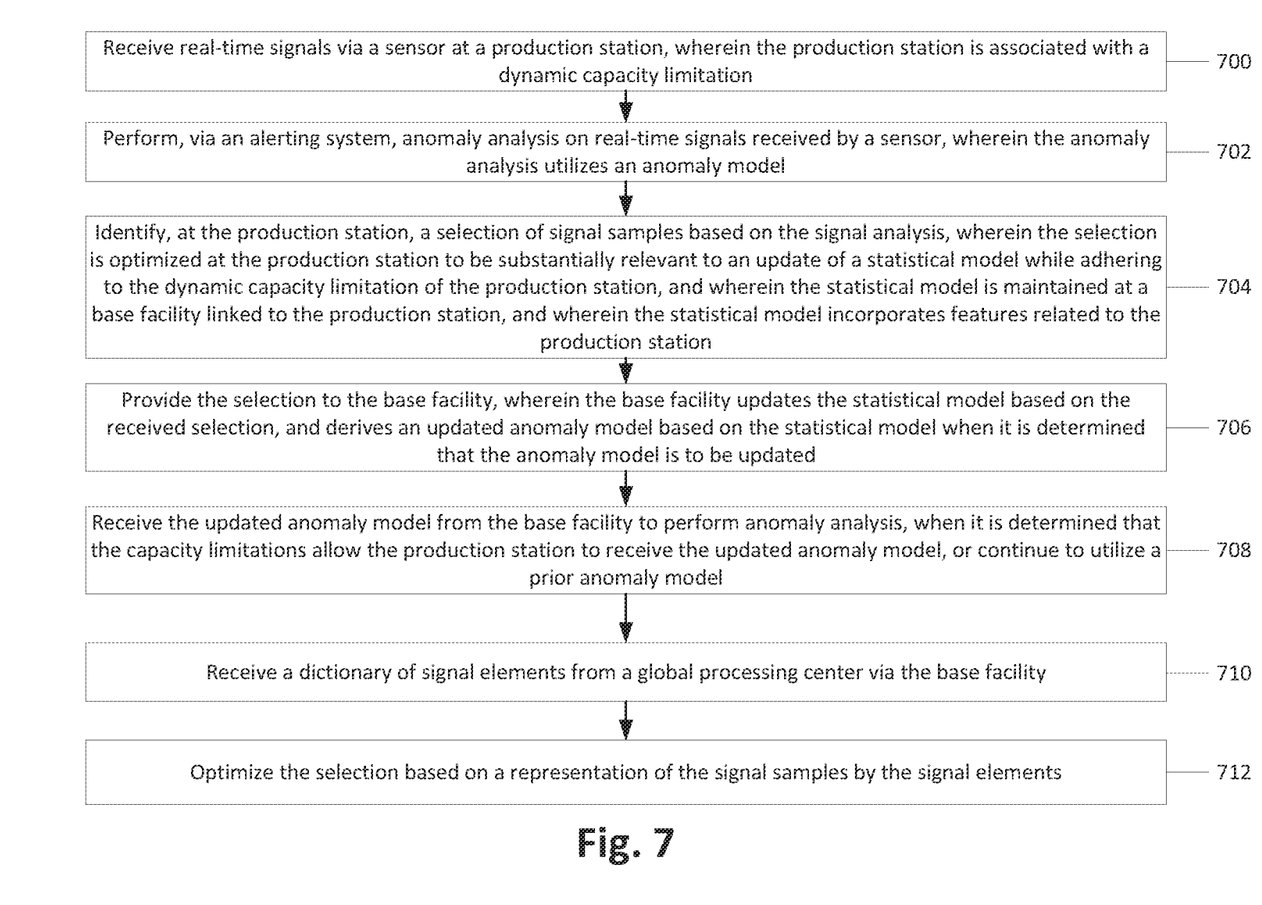
FIG. 7 is a flow diagram illustrating one example of a method for optimizing a selection of signal samples based on a representation of the signal samples by signal elements from a dictionary.

FIG. 7 is a flow diagram illustrating one example of a method for optimizing a selection of signal samples based on a representation of the signal samples by signal elements from a dictionary. In some examples, such an example method may be implemented by a system such as, for example, system 100 of FIG. 1.

At 700, real-time signals are received via a sensor at a production station, where the production station is associated with a dynamic capacity limitation.

At 702, anomaly analysis is performed on real-time signals received by a sensor, where the anomaly analysis utilizes an anomaly model and is performed via an alerting system.

At 704, a selection of signal samples is identified based on the signal analysis, where the selection is optimized at the production station to be substantially relevant to an update of a statistical model while adhering to the dynamic capacity limitation of the production station, and where the statistical model is maintained at a base facility linked to the production station, and where the statistical model incorporates features related to the production station.

At 706, the selection is provided to the base facility, where the base facility updates the statistical model based on the received selection, and derives an updated anomaly model based on the statistical model when it is determined that the anomaly model is to be updated.

At 708, the updated anomaly model to perform anomaly analysis is received from the base facility, when it is determined that the capacity limitation allows the production station to receive the updated anomaly model, or the prior anomaly model is continued to be utilized.

At 710, a dictionary of signal elements is received from a global processing center. For example, the dictionary of signal elements may be received from the global processing center via the base facility, where the dictionary is generated by the global processing center based on deep learning algorithms performed on a plurality of event patterns and signal samples received from a plurality of production stations via a plurality of base facilities.

At 712, the selection may be optimized based on a representation of the signal samples by the signal elements, where an error in the representation of the signal sample is small if the signal sample is substantially represented as a combination of a small number of the signal elements.

Examples of the disclosure provide a generalized system for real-time alerts and transmission of selected signal samples. The generalized system provides a two- or three-tier distributed system framework that enables remote locations with limited computation, storage, and networking resources to process high-rate measurement data streams in real-time, in order to compute anomalies and other complex analytics for real-time/forward looking alerting, and select the right level of compressed data representation to cache and/or transmit from the remote stations to the base, thereby mitigating the storage and/or bandwidth limitations of the remote stations.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An alerting device of a production station, comprising:
processing circuitry; and
a memory including instructions that, when executed on the processing circuitry, cause the alerting device to:
receive a sample stream from a sensor of a set of sensors of the production station;
analyze the sample stream for anomalies in real time by inputting samples of the sample stream into an anomaly machine learning model trained to detect certain event patterns as anomaly patterns;
select a subset of the samples of the sample stream based on an extent of the anomaly patterns of the samples compared to a statistical model, wherein selecting the subset of samples includes determining a link capacity of a link connecting the production station to a base facility containing the statistical model;
transmit the selected subset of samples to the base facility;
receive an updated anomaly machine learning model, wherein the updated anomaly machine learning model is generated based, in part, on the transmitted subset of samples; and
upon receiving the updated anomaly machine learning model, analyze the sample stream for anomalies in real time by inputting samples of the sample stream into the updated anomaly machine learning model.

2. The alerting device of claim 1, wherein the anomaly machine learning model simultaneously analyzes samples streams for each of the set of sensors.

3. The alerting device of claim 1, wherein selecting the subset of samples further includes setting a sample significance threshold based, in part, on the determined link capacity.

4. The alerting device of claim 1, wherein analyzing the sample stream for anomalies includes generating an alert at the production station based on an anomaly pattern alerting rule.

5. The alerting device of claim 4, wherein the anomaly pattern alerting rule is applied to an output of the anomaly machine learning model.

6. The alerting device of claim 1, wherein the production station has a dynamic capacity limitation and the updated anomaly machine learning model is generated based, in part, on the dynamic capacity limitation.

7. The alerting device of claim 1, wherein the statistical model includes information from other production stations.

8. The alerting device of claim 7, wherein the information from other production stations is a dictionary of signal elements from a global processing center communicatively coupled to a set of base facilities.

9. A system, comprising:
a production station, comprising:
an alerting device, including instructions that cause the alerting device to:
receive a sample stream from a sensor of a set of sensors of the production station;
analyze the sample stream for anomalies in real time by inputting samples of the sample stream into an anomaly machine learning model trained to detect certain event patterns as anomaly patterns;
select a subset of the samples of the sample stream based on an extent of the anomaly patterns of the samples compared to a statistical model, wherein selecting the subset of samples includes determining a link capacity of a link connecting the production station to a base facility containing the statistical model;
transmit the selected subset of samples to the base facility;
receive an updated anomaly machine learning model; and
upon receiving the updated anomaly machine learning model, analyze the sample stream for anomalies in real time by inputting samples of the sample stream into the updated anomaly machine learning model; and
the base facility, including instructions that cause the base facility to:
receive, from the alerting device, the subset of samples;
update the statistical model using the subset of samples;
generate an updated anomaly machine learning model based on the updated statistical model; and
transmit the updated anomaly machine learning model to the alerting device.

10. The system of claim 9, wherein analyzing the sample stream for anomalies includes generating an alert at the production station based on an anomaly pattern alerting rule.

11. The system of claim 10, wherein the anomaly pattern alerting rule is applied to an output of the anomaly machine learning model.

12. The system of claim 10, wherein the production station has a dynamic capacity limitation and the updated anomaly machine learning model is generated based, in part, on the dynamic capacity limitation.

13. The system of claim 10, wherein the statistical model includes information from other production stations.

14. The system of claim 13, wherein the information from other production stations is a dictionary of signal elements from a global processing center communicatively coupled to a set of base facilities.

15. The system of claim 9, wherein the anomaly machine learning model simultaneously analyzes samples streams for each of the set of sensors.

16. The system of claim 9, wherein selecting the subset of samples further includes setting a sample significance threshold based, in part, on the determined link capacity.

17. A method, comprising:
receiving a sample stream from a sensor of a set of sensors of the production station;
analyzing the sample stream for anomalies in real time by inputting samples of the sample stream into an anomaly machine learning model trained to detect certain event patterns as anomaly patterns;
select a subset of the samples of the sample stream based on an extent of the anomaly patterns of the samples compared to a statistical model, wherein selecting the subset of samples includes determining a link capacity of a link connecting the production station to a base facility containing the statistical model;

transmitting the selected subset of samples to the base facility;

receiving an updated anomaly machine learning model; and upon receiving the updated anomaly machine learning model, analyze the sample stream for anomalies in real time by inputting samples of the sample stream into the updated anomaly machine learning model.

18. The method of claim 17, wherein the anomaly machine learning model simultaneously analyzes samples streams for each of the set of sensors.

19. The method of claim 17, wherein analyzing the sample stream for anomalies includes generating an alert at the production station based on an anomaly pattern alerting rule.

20. The method of claim 19, wherein the anomaly pattern alerting rule is applied to an output of the anomaly machine learning model.

* * * * *